(12) United States Patent
Maguire et al.

(10) Patent No.: US 10,655,475 B2
(45) Date of Patent: May 19, 2020

(54) GAS TURBINE ENGINE TURBINE COOLING SYSTEM

(71) Applicant: ROLLS-ROYCE plc, London (GB)

(72) Inventors: Alan R Maguire, Derby (GB); Timothy J Scanlon, Derby (GB)

(73) Assignee: ROLLS-ROYCE PLC, London (GB)

(*) Notice: Subject to any disclaimer, the term of this patent is extended or adjusted under 35 U.S.C. 154(b) by 346 days.

(21) Appl. No.: 15/352,468

(22) Filed: Nov. 15, 2016

(65) Prior Publication Data

US 2017/0167273 A1 Jun. 15, 2017

(30) Foreign Application Priority Data

Dec. 14, 2015 (GB) .................................. 1521937.1

(51) Int. Cl.
*F01D 11/24* (2006.01)
*F02C 7/18* (2006.01)
(Continued)

(52) U.S. Cl.
CPC ............. *F01D 5/187* (2013.01); *F01D 9/041* (2013.01); *F01D 11/24* (2013.01); *F01D 25/12* (2013.01);
(Continued)

(58) Field of Classification Search
CPC .......... F01D 5/186; F01D 5/187; F01D 5/284; F01D 9/04; F01D 9/06; F01D 11/14; F01D 11/20; F01D 11/24; F01D 17/105; F01D 25/12; F01D 25/14; F02C 7/12; F02C 7/141; F02C 7/18; F02C 9/18; F05D 2240/81; F05D 2260/606; F05D 2300/6033
See application file for complete search history.

(56) References Cited

U.S. PATENT DOCUMENTS

| | | | | |
|---|---|---|---|---|
| 5,048,288 A | * | 9/1991 | Bessette .................. | F01D 11/24 415/116 |
| 6,048,170 A | * | 4/2000 | Dodd .................... | F01D 11/005 415/135 |

(Continued)

OTHER PUBLICATIONS

Apr. 19, 2017 Search Report issued in European Patent Application No. 16 19 8802.
Jun. 6, 2016 Search Report issued in British Patent Application No. 1521937.1.

*Primary Examiner* — Steven M Sutherland
*Assistant Examiner* — James P McGlynn
(74) *Attorney, Agent, or Firm* — Oliff PLC

(57) ABSTRACT

A gas turbine engine includes a turbine and a turbine cooling arrangement. The turbine includes a turbine rotor surrounded by a static rotor track liner, and a nozzle guide vane downstream of the rotor in a core main gas flow path. The cooling arrangement includes a first air duct that provides cooling airflow to a rotor track liner cooling plenum and a second air duct that provides a cooling airflow to the nozzle guide vane. A common manifold is upstream in the cooling airflow of the ducts and provides cooling air to the ducts. A two-way valve modulates air provided to the ducts from the manifold. The valve is operates in a first or second mode. In the first mode, air flow to the first duct is relatively high and airflow to the second duct is relatively low compared to where the valve is operated in the second mode.

18 Claims, 2 Drawing Sheets

(51) Int. Cl.
*F01D 9/04* (2006.01)
*F01D 25/12* (2006.01)
*F01D 25/24* (2006.01)
*F02C 9/18* (2006.01)
*F01D 11/20* (2006.01)
*F01D 11/14* (2006.01)
*F02C 7/12* (2006.01)
*F01D 5/18* (2006.01)
*F02C 3/10* (2006.01)
*F16K 1/22* (2006.01)
*F23R 3/00* (2006.01)

(52) U.S. Cl.
CPC ............... *F01D 25/24* (2013.01); *F02C 3/10* (2013.01); *F02C 7/18* (2013.01); *F16K 1/221* (2013.01); *F23R 3/007* (2013.01); *F01D 5/186* (2013.01); *F01D 11/14* (2013.01); *F01D 11/20* (2013.01); *F02C 7/12* (2013.01); *F02C 9/18* (2013.01); *F05D 2220/32* (2013.01); *F05D 2260/202* (2013.01); *F05D 2270/3062* (2013.01); *F05D 2300/6033* (2013.01); *Y02T 50/672* (2013.01); *Y02T 50/675* (2013.01)

(56) References Cited

U.S. PATENT DOCUMENTS

| | | | |
|---|---|---|---|
| 6,895,758 B2* | 5/2005 | Knight | F23R 3/28 60/39.281 |
| 6,925,814 B2* | 8/2005 | Wilson | F01D 11/10 415/178 |
| 7,371,043 B2 | 5/2008 | Keller | |
| 7,665,964 B2* | 2/2010 | Taylor | F01D 5/143 415/194 |
| 7,926,289 B2* | 4/2011 | Lee | F01D 5/081 415/145 |
| 8,079,807 B2 | 12/2011 | Shapiro et al. | |
| 2005/0109016 A1 | 5/2005 | Ullyott | |
| 2008/0206046 A1* | 8/2008 | Razzell | F01D 11/005 415/173.1 |
| 2009/0104020 A1 | 4/2009 | Roush et al. | |
| 2012/0076650 A1* | 3/2012 | Akiyama | F01D 11/24 415/213.1 |
| 2014/0112757 A1* | 4/2014 | Bacic | F01D 11/06 415/110 |
| 2014/0271154 A1* | 9/2014 | Floyd | F01D 25/14 415/178 |

\* cited by examiner

GAS TURBINE ENGINE TURBINE COOLING SYSTEM

The present disclosure concerns a gas turbine engine comprising a cooling arrangement.

Modern gas turbine engines frequently employ air cooling to maintain components at a desired temperature and to control expansion. In particular, modern gas turbine engines frequently employ turbine case cooling (TCC) to maintain a gap between the rotating turbine rotor blade tips and the static annular turbine rotor liner (also known as a blade track or a blade shroud) which surrounds the rotor blades. The rotor blades themselves, as well as static nozzle guide vanes (NVGs) upstream and downstream of the blades also frequently require cooling.

In conventional TCC systems, cooling air is supplied to an external side of the turbine casing, to control expansion of the casing. A rotor track liner is provided within the annular casing. The rotor track liner is spaced from the casing, and provides an internal annular surface against which the turbine rotor blades project. A small spacing is maintained between the tips of the rotor blades and the rotor track liner, such that the two do not touch during normal use, except during hard manoeuvres or rapid accelerations.

Currently, most turbine rotor liners are composed of metal alloys such as nickel superalloys. However, in view of the relatively high coefficient of thermal expansion of such alloys, the annulus must be provided in the form of a plurality of segments, to allow relative movement as the temperature within the turbine changes in use.

Alternatively, it has been suggested to employ turbine rotor liners comprising Ceramic Matrix Composite (CMC) materials. CMCs comprise ceramic fibres embedded in a ceramic matrix. In one example, both the fibres and the matrix comprise silicon carbide (SiC). Such materials have high strength, light weight, high temperature capability, and low coefficients of thermal expansion. U.S. Pat. No. 7,371,043 describes one example of a CMC material.

Consequently, it has been proposed to form single piece rotor liners made of CMCs, known as "full hoop" rotor liners. U.S. Pat. No. 8,079,807 describes one example.

In order to cool the full hoop rotor liner, and to control expansion, it is necessary to provide cooling air in use. The cooling air is redirected from a compressor stage of the gas turbine engine, and is generally at a high temperature. In view of the high pressure and temperature of the cooling air, it is desirable to minimise its use, in order to increase the overall efficiency of the gas turbine engine.

The amount of cooling air required for various components varies during operation of the engine. Consequently, it is desirable to modulate cooling flow to the cooled components, to minimise use of compressor air. Modulation of TCC systems is known, in order to reduce TCC cooling flow during certain flight conditions. However, such modulation generally requires additional valves and ducts within the engine, which increases weight and complexity, and may also decrease reliability. In particular, should a valve fail in a closed position, sufficient cooling air may be not be available during some phases of engine operation.

Consequently, aims of the present invention include providing a turbine cooling system which permits modulation of air cooled components, while minimising component count, and which may fail in a safe manner, and minimises weight and air ducting. It is also an aim of the present invention to reduce cooling air flow, to thereby reduce thrust Specific Fuel Consumption (SFC).

According to a first aspect of the invention there is provided a gas turbine engine comprising a turbine and a turbine cooling arrangement, the turbine comprising a turbine rotor surrounded by a static rotor track liner, and a nozzle guide vane downstream of the turbine rotor in a core main gas flow path, the cooling arrangement comprising:

a first cooling air duct configured to provide a cooling airflow to a rotor track liner cooling plenum;

a second cooling air duct configured to provide a cooling airflow to the nozzle guide vane;

a common manifold provided upstream in the cooling airflow of the first and second ducts, and configured to provide cooling air to the first and second ducts; and a two-way valve configured to modulate air provided to the first and second ducts from the manifold, the valve being configured to operate in one of a first mode and a second mode, wherein when the valve is operated in the first mode, air flow to the first duct is relatively high and airflow to the second duct is relatively low compared to where the valve is operated in the second mode.

Advantageously, a single two-way valve can be employed to modulate air to both the NGV and the rotor track liner. It has been found by the inventors that the cooling requirements of the rotor track liner and the NGVs are negatively correlated, such when the rotor track liner cooling requirements are high, downstream NGV cooling requirements are low, and vice versa. Consequently, a single valve and a single cooling air source (via the manifold) can be provided, yet full cooling air control can be maintained.

The rotor track liner may comprise a ceramic matrix composite material, and may comprise silicon carbide fibres embedded within a silicon carbide matrix. The rotor track liner may comprise a single piece annular component.

The common manifold may comprise an inlet in fluid communication with a main compressor of the gas turbine engine, such that the cooling air comprises main compressor bleed air. The gas turbine engine may comprise a low pressure compressor and a high pressure compressor provided downstream of the low pressure compressor in the main gas flow path. The inlet of the common manifold may be in fluid communication with a stage of the high pressure compressor, and may be in fluid communication with a seventh stage of the high pressure compressor.

The two-way valve may comprise one of a mechanical valve such as a butterfly valve, or may comprise a fluidic valve such as a bi-stable fluidic valve. The cooling arrangement may comprise a plurality of bi-stable fluidic valves arranged in series.

The rotor track liner cooling plenum may comprise a cooling air exhaust outlet, which may be in fluid communication with a cooling air inlet of the NGV. Advantageously, spent cooling air used in cooling the rotor track liner is re-used for cooling the NGV. Consequently, cooling air is more efficiently utilised, thereby reducing overall cooling requirements.

The two-way valve may be configured such that a non-zero quantity of cooling air is provided to the second duct when the valve is in the first mode. Consequently, should the valve fail in the second mode, a minimum amount of cooling air for safe operation is still provided, thereby preventing engine damage.

The gas turbine engine may comprise a further nozzle guide vane provided upstream of the turbine rotor in the main gas flow path. The gas turbine engine may comprise a high pressure turbine coupled to a high pressure compressor, may comprise an intermediate pressure turbine coupled to an intermediate pressure compressor, and may comprise a low pressure turbine coupled to a fan. The high pressure turbine may comprise the turbine rotor. The nozzle guide vane may be provided between the high pressure turbine and the intermediate pressure turbine in the main gas flow path.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
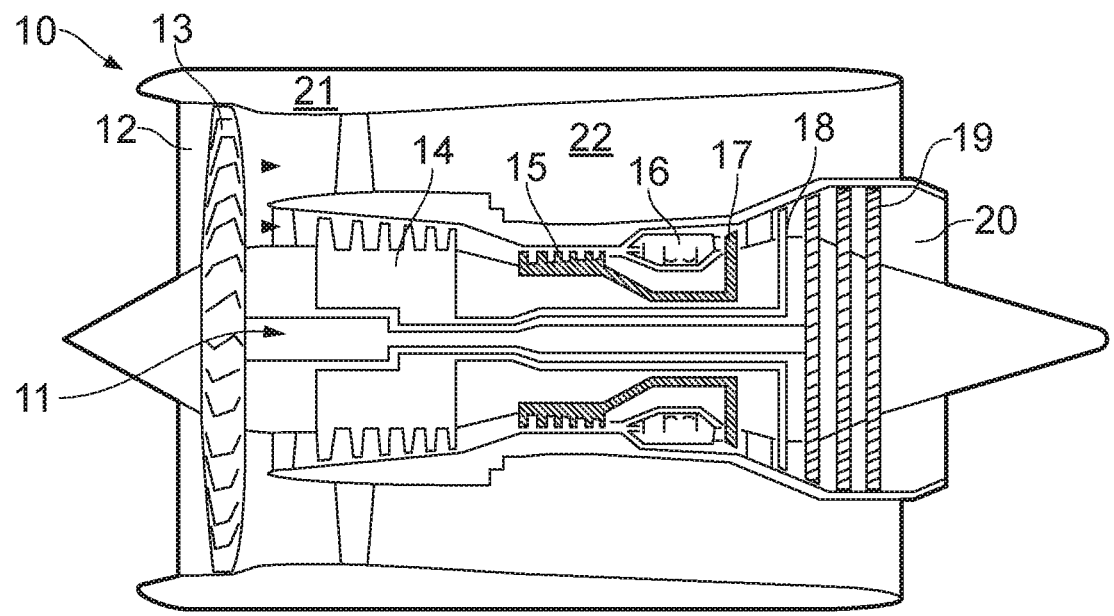
FIG. 1 is a schematic sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20. Each of the intermediate pressure and high pressure compressor 14, 15 comprise multi-stage axial compressors.

The gas turbine engine 10 works in the conventional manner so that air entering the intake 12 is accelerated by the fan 13 to produce two air flows: a first air flow A into the intermediate pressure compressor 14 and a second air flow B which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
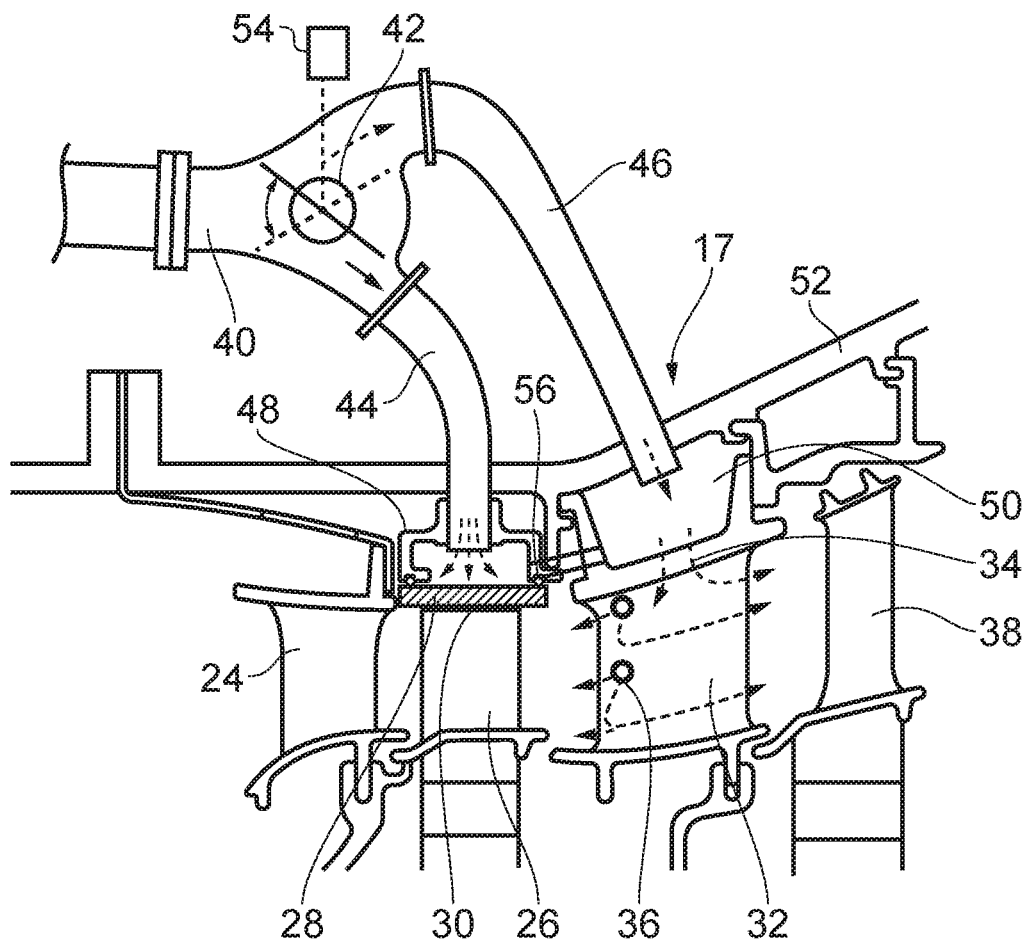
FIG. 2 is a sectional side view of a first cooling system for part of the gas turbine engine of FIG. 1 operated in a first mode.

FIG. 2 shows a cross sectional view of the region bounded by dotted lines in FIG. 1. As can be seen, the high pressure turbine 17 comprises a static first stage high pressure nozzle guide vane (NGV) 24, which is provided immediately downstream of the combustion equipment 16 in the main engine core flow. The NGV 24 directs hot exhaust gas at a desired angle toward a high pressure turbine rotor 26, which provided immediately downstream in the main engine core flow. The high pressure turbine rotor 26 is configured to rotate about the engine axis 11, to thereby drive the high pressure compressor 15 in use. The high pressure turbine rotor 26 is surrounded by an annular turbine track liner 28, which is provided adjacent a radially outer tip of the rotor 26, and having an inner surface which directly opposes the rotor tip. An annular gap 30 between the liner 28 and rotor 26 is defined. The gap distance varies in use, as described in further detail below. In general, it is desirable to minimise the gap 30 to thereby reduce leakage flow through the gap, while ensuring that the gap does not close completely, to thereby avoid tip rubs.

The liner 28 comprises a Ceramic Matrix Composite (CMC) material, i.e. a composite material comprising ceramic fibres or particle embedded within a ceramic matrix. In the described embodiments, the both the fibres and matrix of the CMC material comprise silicon carbide. The liner 28 comprises a single-piece, integrally formed, monolithic annular component, which extends around the whole circumference of the annulus, in the form of a ring. Consequently, thermal expansion and contraction of the liner 28 results in varying internal and external diameters. It will be understood that the liner may comprise a plurality of fully annular rings.

Downstream of the high pressure turbine 26 in the main engine core gas flow is a second stage high pressure NGV 32. The NGV 32 is similar to the NGV 24, and is static in use. The NGV 34 comprises internal cooling channels 34, which extend in a generally radial direction, and communicate with a plurality of film cooling holes 36 provided on an external surface of the NGV 32. In use, the NGV 32 directs hot exhaust gas toward an intermediate pressure turbine rotor 38, which is provided downstream of the NGV 32 in the main engine core flow. The intermediate pressure rotor 38 and second stage NGV 32 form part of the intermediate pressure turbine 18.

Each of the first stage NGV 24, high pressure turbine rotor 26, second stage NGV 32, intermediate pressure turbine rotor 38 and rotor track liner 28 are provided within a turbine casing 52, which extends annularly around each of these components, and to which the NGVs 24, 32 and rotor track liner 28 are mounted.

A turbine cooling arrangement is provided, which provides cooling air to various turbine components, and defines a secondary airflow, which is provided from one of the compressors, bypasses at least part of the main engine core flow, and may re-join the engine core flow. The turbine cooling arrangement comprises a common manifold 40 which receives secondary air flow comprising cooling air bled from one if the compressors 14, 15 (in this case, the seventh stage of the high pressure compressor 15). The common manifold comprises a duct, having dimensions and formed of a material suitable for carrying the necessary high pressure, high temperature air. For example, the duct may comprise a nickel alloy such as Inconel 718™.

Figure 3:
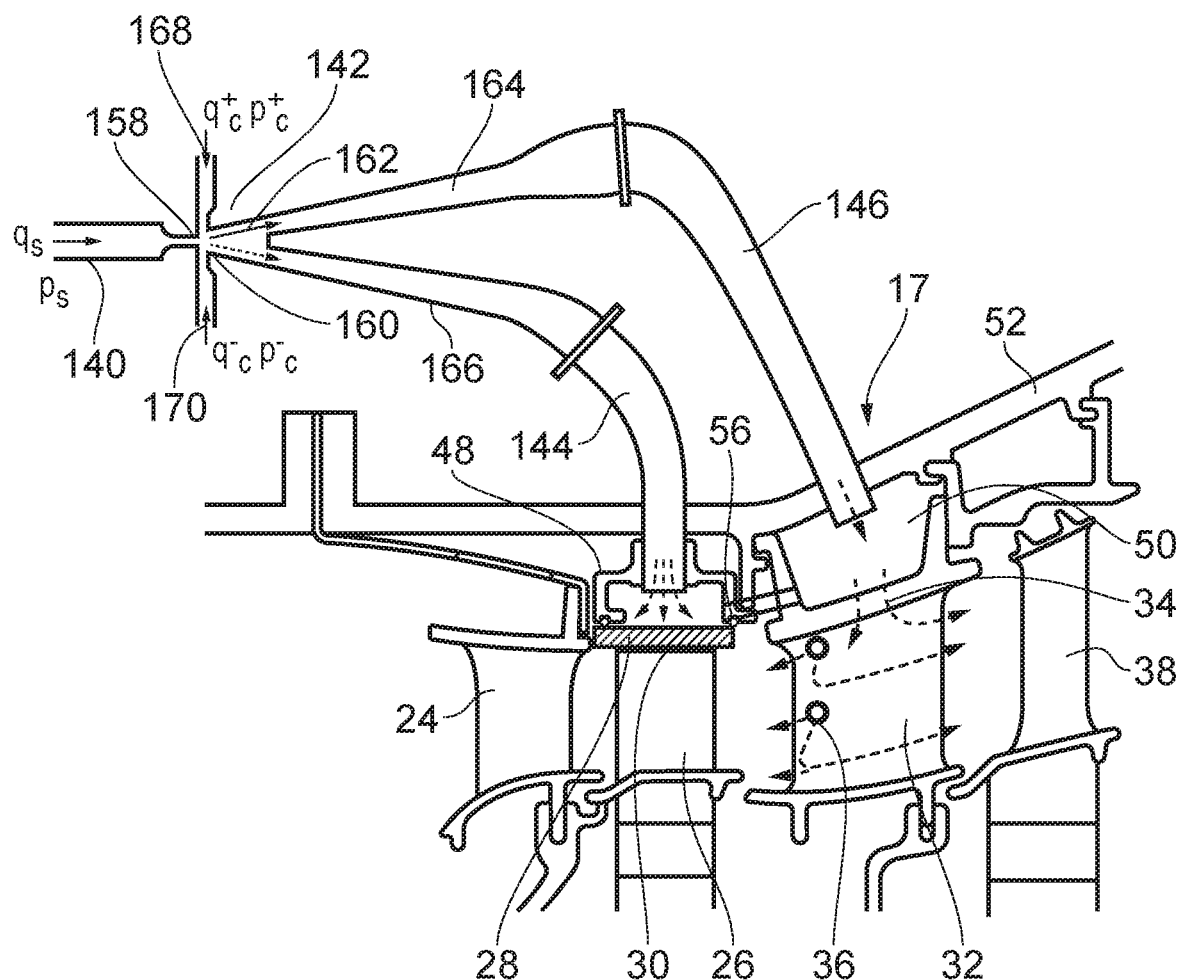
FIG. 3 is a sectional side view of a second cooling system for part of the gas turbine engine of FIG. 1 operated in a first mode.

Downstream of the common manifold 40 in the secondary airflow is a two-way valve in the form of a butterfly valve 42. The butterfly valve 42 comprises an inlet in fluid communication with the manifold 40, and first and second outlets in fluid communication with first and second cooling air ducts 44, 46 respectively. The two-way valve 42 is configured to operate in at least first and second modes. In a first mode (as illustrated by the solid line in FIG. 2), secondary air flow to the first duct 44 is relatively high, and airflow to the second duct 46 is relatively low. In comparison, in the second mode (as illustrated by the butterfly valve moving to the position shown by the dotted lines in FIG. 2), secondary air flow to the first duct 44 is relatively low, and airflow to the second duct 46 is relatively high. Even in the first mode however, as shown in FIG. 3, a minimum amount of cooling air is provided to the second cooling duct 46, since the butterfly valve does not shutoff cooling airflow to the second cooling duct 46 completely.

The valve 42 is switched between the two operating modes by physically changing the angle of the valve 42 between a first position (as shown by the solid lines in FIG.

2) and a second position (as shown by the dotted lines in FIG. 2), and, in the present embodiment, to an intermediate position between the first and second positions. Consequently, the valve 42 comprises a bearing (not shown) which permits the valve 42 to turn. The bearing may comprise a material such as CMC. The valve 42 is controlled by an actuator (not shown), which is in turn controlled by a controller 54 in accordance with a schedule, as explained in further detail below.

The first cooling duct 44 provides cooling air to a rotor track liner plenum 48, which extends annularly around a radially outer surface of the track liner 28. Consequently, secondary airflow from the seventh stage of the high pressure compressor 15 impinges on the radially outer surface of the rotor track liner when the valve 42 is operated in the first mode. Consequently, the rotor track liner 28 is cooled by the impingement flow, and contracts, thereby reducing the gap 30 between the high pressure turbine rotor 26 and the rotor track liner 28.

The second cooling duct 46 extends to the second stage NGV 32, and communicates with an inlet of the internal cooling channel 34 of the NGV 32 via a cooling plenum 50, which is provided at a radially outer end of the NGV 32, and extends around a circumference of the NGV 32. Consequently, the second cooling duct provides secondary cooling air in use for each of film cooling, internal cooling and radial end wall cooling of the NGV 32.

The rotor track liner plenum 48 comprises an exhaust outlet 56 located adjacent the trailing edge (with respect to the main core gas flow) of the rotor track liner 28. The exhaust outlet 56 communicates with the NGV cooling plenum 50, such that at least a portion of air exhausted from the rotor track liner plenum 48 is provided to the second stage NGV 32.

In use, the valve 42 is controlled by the controller 54 in accordance with a schedule, as follows.

During aircraft takeoff, engine power is increased from a relatively low level. Consequently, it is necessary to increase second stage NGV 32 cooling air flow, in order to maintain the NGV 32 at or below a desired temperature. Meanwhile, the gap 30 between the rotor track liner 28 and the high pressure turbine rotor 26 will be relatively small in view of thermal expansion of the high pressure turbine rotor 26. Consequently, the valve 42 will be actuated to the second position, such that cooling air is provided to the second stage nozzle guide vane 32 at a relatively high rate, and to the rotor track liner plenum 48 at a relatively low rate, or not at all.

During climb, the heat imparted to the rotor track liner 28 will start to cause the liner 28 to expand, and thereby increase in diameter. Consequently, the gap 30 will tend to increase. In order to prevent the gap 30 from increasing, cooling airflow is provided to the plenum 48 by actuating the valve 42 to an intermediate position between the first and second positions, such that such that flow to the first and second ducts 44, 46 is at an intermediate level. Meanwhile, the cooling airflow requirement to the second stage NGV 32 is reduced during this phase of flight since, as the aircraft climbs, the compressor inlet temperature reduces. However, some flow is still required, and so the reduced cooling airflow through the second duct 46 due to the valve 42 being operated in the intermediate position is desirable.

Subsequently, when the aircraft is operated during cruise, the engine power is reduced. Consequently, the high pressure turbine rotor 26 cools and contracts, opening up the gap 30 once more. In this case, more cooling air to the plenum 48 is required to close the gap 30, and so the valve 42 is operated in the first position (as shown in FIG. 3), with relatively more air being provided to the first duct 44, and a reduced (though non-zero) amount of air being supplied to the second duct 46. In view of the reduced engine power, the reduced cooling airflow to the second stage NGV 32 does not have a negative impact on this component. Furthermore, in view of the relatively large amount of airflow supplied to the first stage rotor track liner cooling plenum 48, which subsequently leaks through the exhaust outlet 56, cooling air is still provided to the second stage NGV 32, albeit at a higher temperature than when the valve 42 is operated in the second position.

FIG. 3 illustrates a second cooling arrangement of the present invention, suitable for use with the gas turbine engine of FIG. 1. In this embodiment, similar components are given equivalent reference numerals, incremented by 100.

In this case, the cooling system comprises a valve 142, which again selectively provides air to first and second ducts 144, 146 in accordance with either a first operation mode (as illustrated by the dotted arrow in figure by the solid arrow in FIG. 3) in which air flow to the first duct 144 is relatively low, and airflow to the second duct 146 is relatively high. Even in the first mode however, as shown in FIG. 4, a minimum amount of cooling air is provided to the second cooling duct 146, in view of turbulent air continuing to flow through the second duct 146, as will be described in further detail below.

The valve 142 comprises a fluidic valve having an inlet 158 in fluid communication with a common manifold 140. The valve 142 comprises an outward step displacement 160 downstream of the inlet 158, which comprises a pair of walls extending generally perpendicular to airflow entering the inlet 158. This step displacement 160 causes flow to separate at this region. Downstream of the step displacement 160 is a generally divergent section 162, which birfurcates into the first and second cooling ducts 144, 146 at a downstream end. Flow flowing through the divergent section 162 from the inlet will tend to reattach to one of an upper wall 164 and a lower wall 166 of the divergent section 162. This flow will then flow either through to the first duct 144 (where the flow reattaches to the upper wall 164) or the second duct 146 (where the flow reattaches to the lower wall 166). The remaining turbulent flow will continue down the other duct 144, 146, at a lower mass flow rate.

The valve 142 is controlled by applying a control air flow through one of a first 168 or a second 170 control channel. The first control channel 168 comprises an air duct, which communicates with an upstream end of the divergent section 162, downstream of the step displacement 160, and penetrates through the upper wall 164 to thereby provide a supply of air normal to the air entering from the manifold 140, in a direction toward the lower wall 166. Similarly, the second control channel 170 comprises an air duct which communicates with an upstream end of the divergent section 162, downstream of the step displacement 160, and penetrates through the lower wall 166 to thereby provide a supply of air normal to the air entering from the manifold 140, in a direction toward the upper wall 164. The air supply for each of the control channels 168, 170 is provided from a compressor of the gas turbine engine, and is controlled via a respective control valve (not shown). Consequently, where air is provided through the first control channel 168, air entering the valve 142 from the manifold 140 is urged toward the lower wall 166, such that airflow reattaches to this wall, and flows toward the first duct 144, as shown by the dotted arrow in FIG. 3. Similarly, air through control channel 170 will cause air entering the valve 142 from the manifold 140 to be urged toward the upper wall 164, such that airflow reattaches to this wall, and flows toward the second duct 146 as shown by the solid arrow in FIG. 3. In general, relatively low flows are required through the control channels 168, 170, such that the fluidic valve acts as an amplifier. Since no moving parts are required in the valve 142 itself, it can be highly reliable. Again, the valve 142 is operated in accordance with a schedule similar to that described above for the first embodiment.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the liner may comprise different CMC materials, or may comprise a non-CMC material, such as a high temperature metallic alloy (e.g. nickel super-alloy). Different types of valves could be provided. The valves could be operated in accordance with a different schedule. Different nozzle guide vanes could be cooled in accordance with the invention. Similarly, the cooled rotor track liner could be provided at a different stage of the turbine. The invention is applicable to aircraft gas turbines, and to gas turbines used to power different loads, such as electrical generators.

The invention claimed is:

1. A gas turbine engine comprising a turbine and a turbine cooling arrangement, the turbine comprising a turbine rotor surrounded by a static rotor track liner comprising a single piece annular component, and a nozzle guide vane downstream of the turbine rotor in a core main gas flow path, the turbine cooling arrangement comprising:
    a first cooling air duct configured to provide a cooling airflow to a rotor track liner cooling plenum that directly impinges on the rotor track liner;
    a second cooling air duct configured to provide a cooling airflow to the nozzle guide vane;
    a common manifold provided upstream in the cooling airflow of the first and second ducts, and configured to provide cooling air to the first and second ducts; and
    a two-way valve configured to modulate air provided to the first and second ducts from the manifold, the valve being configured to operate in one of a first mode and a second mode,
    wherein when the valve is operated in the first mode, air flow to the first duct is relatively high and airflow to the second duct is relatively low compared to where the valve is operated in the second mode,
    the rotor track liner has an inner surface which directly opposes a tip of the turbine rotor,
    the cooling airflow exiting the first cooling air duct impinges on the rotor track liner directly from the first cooling air duct to the rotor track liner,
    the rotor track liner cooling plenum includes a cooling air exhaust outlet disposed at a trailing edge of the rotor track liner with respect to a main core gas flow through the gas turbine engine, and
    the cooling air exhaust outlet is in fluid communication with a cooling air inlet of the nozzle guide vane.

2. The gas turbine engine according to claim 1, wherein the rotor track liner comprises a ceramic matrix composite material.

3. The gas turbine engine according to claim 2, wherein the ceramic matrix material comprises silicon carbide fibres embedded within a silicon carbide matrix.

4. The gas turbine engine according to claim 1, wherein an inlet of the common manifold is in fluid communication with a main compressor of the gas turbine engine, such that the cooling air comprises main compressor bleed air.

5. The gas turbine engine according to claim 4, wherein the inlet of the common manifold is in fluid communication with a stage of the high pressure compressor.

6. The gas turbine engine according to claim 5, wherein the inlet of the common manifold is in fluid communication with a seventh stage of the high pressure compressor.

7. The gas turbine engine according to claim 1, wherein the gas turbine engine comprises a low pressure compressor and a high pressure compressor provided downstream of the low pressure compressor in the main gas flow path.

8. The gas turbine engine according to claim 7, wherein an inlet of the common manifold is in fluid communication with a stage of the high pressure compressor.

9. The gas turbine engine according to claim 8, wherein the inlet of the common manifold is in fluid communication with a seventh stage of the high pressure compressor.

10. The gas turbine engine according to claim 1, wherein the two-way valve comprises one of a mechanical valve and a fluidic valve.

11. The gas turbine engine according to claim 1, wherein the two-way valve is configured such that a non-zero quantity of cooling air is provided to the second duct when the valve is in the first mode.

12. The gas turbine engine according to claim 1, wherein the gas turbine engine comprises a further nozzle guide vane provided upstream of the turbine rotor in the main gas flow path.

13. The gas turbine engine according to claim 1, wherein the gas turbine engine further comprises a high pressure turbine coupled to a high pressure compressor, an intermediate pressure turbine coupled to an intermediate pressure compressor, and a low pressure turbine coupled to a fan.

14. The gas turbine engine according to claim 13, wherein the high pressure turbine comprises the turbine rotor.

15. The gas turbine according to claim 13, wherein the nozzle guide vane is provided between the high pressure turbine and the intermediate pressure turbine in the main gas flow path.

16. The gas turbine engine according to claim 1, wherein the rotor track liner cooling plenum extends annularly around a radially outer surface of the rotor track liner such that air from the first cooling air duct impinges on the radially outer surface of the rotor track liner.

17. The gas turbine engine according to claim 1, wherein the cooling airflow exiting the first cooling air duct impinges on the rotor track liner directly from the first cooling air duct to the rotor track liner through the plenum.

18. The gas turbine engine according to claim 1, wherein the cooling airflow exits the first cooling air duct directly into the plenum.

* * * * *